United States Patent [19]

Honey et al.

[11] Patent Number: 5,389,790
[45] Date of Patent: Feb. 14, 1995

[54] TECHNIQUE FOR DETECTING AND IDENTIFYING CERTAIN OBJECTS

[75] Inventors: Richard C. Honey, San Mateo; Robert A. Brown, Redwood City, both of Calif.

[73] Assignee: SRI International, Menlo Park, Calif.

[21] Appl. No.: 656,766

[22] Filed: Feb. 15, 1991

[51] Int. Cl.⁶ .................................. G06K 9/46
[52] U.S. Cl. ........................... 250/342; 382/17
[58] Field of Search ................. 382/17; 455/604; 250/342; 359/154

[56] References Cited

U.S. PATENT DOCUMENTS

| | | | |
|---|---|---|---|
| 2,582,728 | 1/1952 | Walker | 356/1 |
| 3,277,303 | 10/1966 | Jensen et al. | 455/607 |
| 3,551,676 | 12/1970 | Runnels | 250/353 |
| 3,620,626 | 11/1971 | Daly et al. | 356/4 |
| 3,652,981 | 3/1972 | Campanella | 340/961 |
| 3,740,559 | 6/1973 | Scanlon et al. | 455/614 |
| 4,277,170 | 7/1981 | Miles | 356/152 |
| 4,527,158 | 7/1985 | Runnels | 340/961 |
| 4,633,522 | 12/1986 | Yamamoto et al. | 455/603 |
| 4,689,827 | 8/1987 | Gurney, Jr. | 455/614 |
| 4,713,669 | 12/1987 | Shuch | 342/455 |
| 4,755,818 | 7/1988 | Conrad | 340/961 |
| 4,881,270 | 11/1989 | Knecht et al. | 382/17 |
| 5,001,348 | 3/1991 | Dirscherl et al. | 250/372 |

FOREIGN PATENT DOCUMENTS

3323698 1/1985 Germany ................. 455/604

*Primary Examiner*—Mark Hellner

[57] ABSTRACT

There is disclosed herein a technique for detecting and/or identifying a particular object from which electromagnetic radiation is emitted or reflected at an intensity which fluctuates in accordance with a frequency pattern unique to that object. In accordance with the technique, the fluctuating electromagnetic radiation is detected by suitable equipment which can operate across an optical bandwidth extending from the ultraviolet (200 nm) to the infrared (14 micrometers) spectrum. The detected electromagnetic radiation is converted to an electrical signal having the same unique frequency pattern as the electromagnetic radiation itself. This electrical signal, its frequency pattern serving as an identifying signature of the object in question, is used to detect, track, and/or identify the object.

19 Claims, 6 Drawing Sheets

TECHNIQUE FOR DETECTING AND IDENTIFYING CERTAIN OBJECTS

The present invention relates generally to object detection, identification, and tracking schemes, and more particularly to a technique for detecting and identifying particular objects from which electromagnetic radiation is emitted at intensities that fluctuate in accordance with frequency patterns unique to those objects. Objects of the type just described generally fall into one of two broad categories: those that emit their own electromagnetic radiation, for example an AC-driven light bulb; and those that modulate ambient light, for example a spinning propeller or other such moving targets that reflect sunlight. Specific examples of objects falling into the first of these two categories include AC powered lights, missile and rocket launches, artillery flashes, gunfire, explosion, ground fires, target designators, rocket plumes, electric arcs, flares, and sun glints. Examples of specific objects falling into the moving target category include helicopters, airplanes, wheeled vehicles, jets, motors, and generators.

The human eye is a remarkably versatile detector, but it does have certain limitations. Instruments such as binoculars, low-light-imagers, and infrared (IR) sensors are used to overcome some of these limitations (magnification, sensitivity, spectral band-width, respectively.)

An additional limitation of the eye, one which is particularly relevant to the present invention, is its poor frequency response. The eye cannot detect intensity fluctuations above approximately 50 Hz (known as the critical fusion frequency). Equivalently, the effective shutter speed for the eye is about 0.02 seconds. Thus, information carried at frequencies above 50 Hz cannot be detected by the unaided eye. As a result, the unaided eye sees the flickering object as a continuous light source. In many cases, this reduces the number of clues needed for identifying the object in question. Indeed, the object may go unnoticed by the unaided eye.

In view of the foregoing, it is a goal of the present invention to provide an uncomplicated and yet reliable technique for detecting and/or identifying a particular object from which electromagnetic radiation is emitted at an intensity that fluctuates in accordance with a frequency pattern unique to that object.

A more particular goal of the present invention is to provide a technique for detecting and/or identifying a particular object from which electromagnetic radiation is emitted at an intensity that fluctuates at a frequency not easily discernible by the human eye, but nevertheless characteristic of the object.

Still a more particular goal of the present invention is to provide a technique of the last mentioned type in which the human ear can be made part of the overall detection and/or identification scheme.

As will be seen hereinafter, the detection and/or identification technique disclosed herein provides means for detecting fluctuating electromagnetic radiation from the object in question and means for converting the detected radiation to an electric signal. This signal, in accordance with the present invention, retains the same unique frequency pattern as the electromagnetic radiation itself and is used to detect and/or identify the object in question.

In an actual working embodiment, the detection/identification scheme disclosed herein acts on electromagnetic radiation within a spectral band extending from the ultra-violet spectrum to the infrared spectrum. Because many objects of interest, as exemplified above, emit electromagnetic radiation at intensities which fluctuate at frequencies above approximately 50 Hz, that is, frequencies not easily discernible by the human eye, the actual embodiment of the present invention includes two particular means that compensate for this. First, means are provided for analyzing the electric signal, which serves as an identifying signature of the object, and for comparing this identifying signature of the object in question with one or more pre-established signatures of known objects. From this comparison between the identifying signature and the pre-established signatures, the object in question can be detected and identified. As a second way to compensate for frequency fluctuations, means are provided in the actual working embodiment of the present invention for converting the optically modulated electric signal to a corresponding acoustical signal at an intensity that fluctuates in accordance with a frequency pattern unique to the object and easily discernible by the ears. In addition to both of these compensation features, as will be seen hereinafter, the actual working embodiment of the present invention provides for a permanent recording of the fluctuating electromagnetic radiation, where possible.

The present invention will be described in more detail hereinafter. In conjunction with the drawings, wherein.

Figure 1:
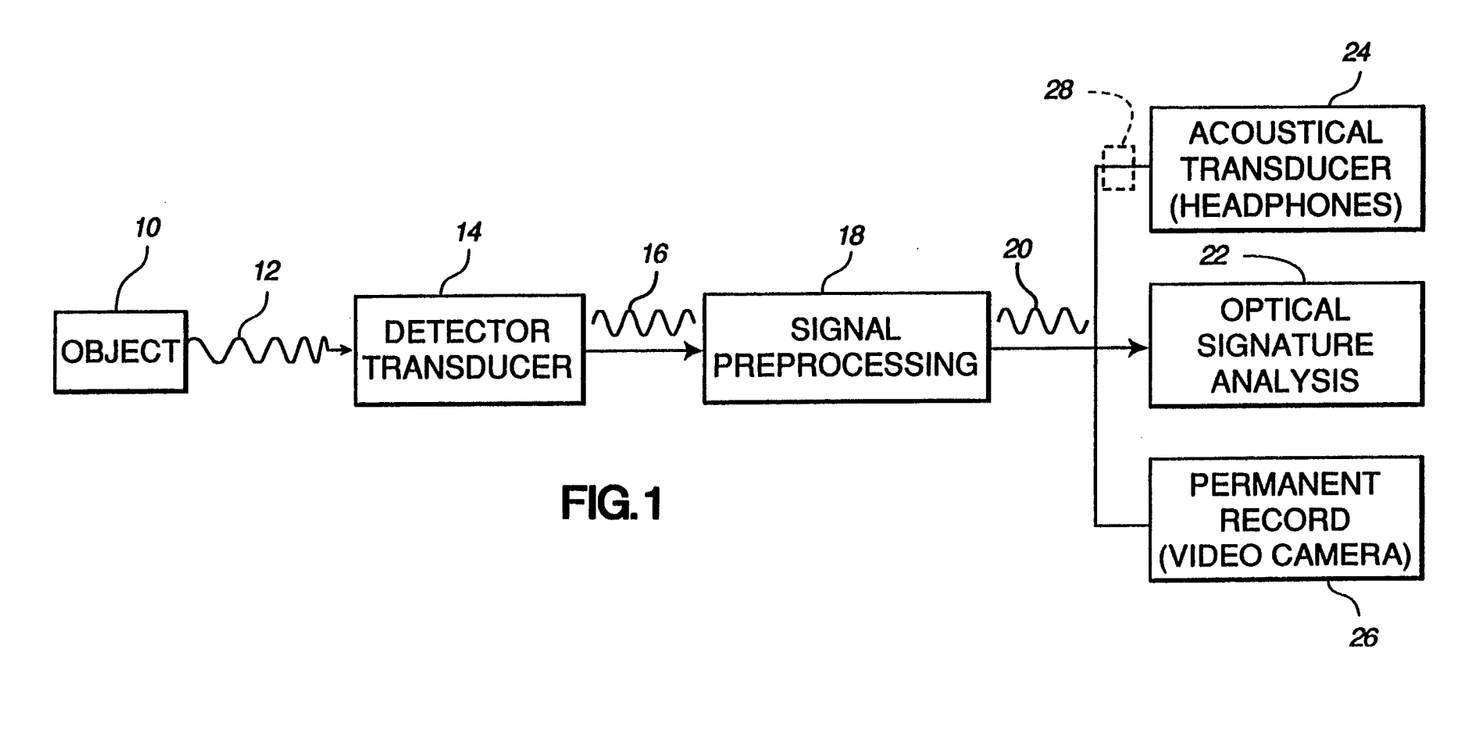
FIG. 1 is a block diagram of a technique designed in accordance with the present invention for detecting and/or identifying a particular object, from which electromagnetic radiation is emitted at an intensity that fluctuates in accordance with a frequency pattern unique to that object but at a high frequency not discernible by the human eye.

Turning now to the drawings, wherein like components are designated by like reference numerals throughout the various figures, attention is initially directed to FIG. 1. As indicated above, this Figure depicts by means of a block diagram, a technique for detecting and identifying a particular object in accordance with the present invention. The object itself which is generally indicated by the reference numeral 10 is one from which electromagnetic radiation, generally indicated at 12, is emitted or reflected with an intensity that fluctuates in accordance with a frequency pattern unique to that object. Examples of object 10 are referred to above. Thus, if the object in question happens to be an AC powered light, its emitted electromagnetic radiation will fluctuate in accordance with a frequency pattern that is different than, for example, the frequency pattern of electromagnetic radiation emitted from a ground fire, a target designator, a helicopter, and so on. In other words, each object emits its own optical signature, as will be seen which, is used to accurately detect and/or identify the object in question and to distinguish it from other objects and from the ambient surroundings.

A combination detector/transducer 14 is provided for detecting intensity fluctuating electromagnetic radiation 12 and for converting the detected radiation to an electrical signal 16 having the same unique frequency pattern as the electromagnetic radiation itself. Thus, the electrical signal, actually, its frequency pattern, also serves as an identifying signature of object 10. The combination detector/transducer may be of any suitable and readily providable type capable of detecting electromagnetic radiation within a given spectral band of interest and producing signal 16 with the same frequency pattern. In the actual working embodiment, as will be seen, at least three detectors/transducers are provided to detect radiation within a spectral band extending from the visible spectrum to the infrared spectrum. However, it is to be understood that the present invention is not limited to any particular spectral band so long as the spectral band of interest is capable of being detected by a suitable detector/transducer.

Once electrical signal 16 is generated, it is subjected to conventional and readily providable signal processing circuitry 18 so as to eliminate noise and other artifacts. The cleaned up signal 20, and particularly its frequency pattern, is now ready to be used to detect and/or identify the object itself. Two different means may be used to identify object 10 by means of signal 20 as will be discussed immediately below. One such means (analyzing circuitry) analyzes the optical signature of signal 20, as indicated at 22. The other means, specifically, an acoustical transducer (headphone) 24, converts signal 20 to an acoustical signal, that is an audible sound, with an intensity that fluctuates in accordance with the same frequency pattern as electrical signals 16 and 20 and electromagnetic radiation 12.

Optical signature analysis circuitry 22 includes memory circuits that contain pre-established optical signatures corresponding to electrical signal 20 for known objects including, hopefully, the particular object 10 in question. Specific circuitry is also provided for comparing the unknown signal 20 with the pre-established signatures or signals in order to identify the object in question. Through continued use, the data bank of pre-established signatures could be enlarged. Should the data bank not include a pre-established signature corresponding to the one in question, at least the analysis provides an accurate means for detecting the presence of the object from its ambient surroundings. Though not shown in FIG. 1, optical signature analysis circuitry 22 may include a visual display or an audio output indicating that object 10 has been detected and, where possible, identified. It should be apparent from the foregoing that optical signature analysis circuitry 22 relies solely on physical equipment to detect and/or identify object 10, and does not in any way rely on the human senses.

As indicated previously, the human eye has a poor frequency response. That is, the eye cannot detect intensity fluctuations above approximately 50 Hz. Therefore, in those cases, where electromagnetic radiation is in the visible spectrum, that is, a flickering light and its frequency pattern is above about 50 Hz, the flickering of the light will not be visible to the human eye. As a result, acoustical transducer 24 converts signal 20 to a corresponding acoustical signal which can be heard by the human ear. This acoustical signal is produced at an intensity that fluctuates in accordance with a frequency pattern unique to the object. Therefore, the human ear can only detect the presence of object 10, but with practice, it can identify the object by its frequency pattern. In this regard, the bandwidth of the human ear is only about 20 kHz at best. Therefore, should the frequency pattern of signal 20 be greater than the bandwidth of the human ear, suitable means that may form part of signal processing circuitry 18 or which is in line with acoustical transducer 24, as indicated by dotted lines at 28, may be provided to downconvert the signal entering acoustical transducer 24 so as to drive the transducer within the audio or acoustical band. An example of suitable circuitry to accomplish this would be a square wave local oscillator (tuneable from dc to 65 kHz) utilized so that the frequency of the electrical signal may be mixed with the local oscillator or its harmonics. On the other hand, if the frequency pattern of electromagnetic radiation 12 is itself within the bandwidth of the human ear, the ultimately produced electrical signal does not need to be downconverted before it is transformed into an acoustical signal. In either case, the human ear can be trained to recognize the latter signal that corresponds to the known object.

Because of its ability to "hear" the electromagnetic radiation 12 emitted from object 10, the overall technique illustrated in FIG. 1 is referred to as "optical listening". An overall apparatus generally indicated by the reference numeral 30 in FIGS. 2 and 3 has been constructed in accordance with the present invention to carry out this technique and relies on analyzing the frequency spectrum of a target modulated optical signature, as described above. Modulating signatures are caused either by fluctuating sources at the target (e.g., jet exhaust) or by moving surfaces at the target (e.g. tank tracks) that modulate the ambient light, as stated. As will be seen below, apparatus 30 actually consists of three optical listening devices operating in three spectral bands from the visible to the thermal infrared (IR). Target signatures in the visible and the IR spectrums result from fundamentally different physical processes and thus together they provide more information than either alone. In addition to this sensor suite (as it may be called) the overall apparatus includes a data analysis system that fuses the data from the sensors to increase discrimination against background noise and improve sensitivity. This optical listening sensor suite and the data analysis making up overall apparatus 30 will be described in more detail below.

Figure 2:
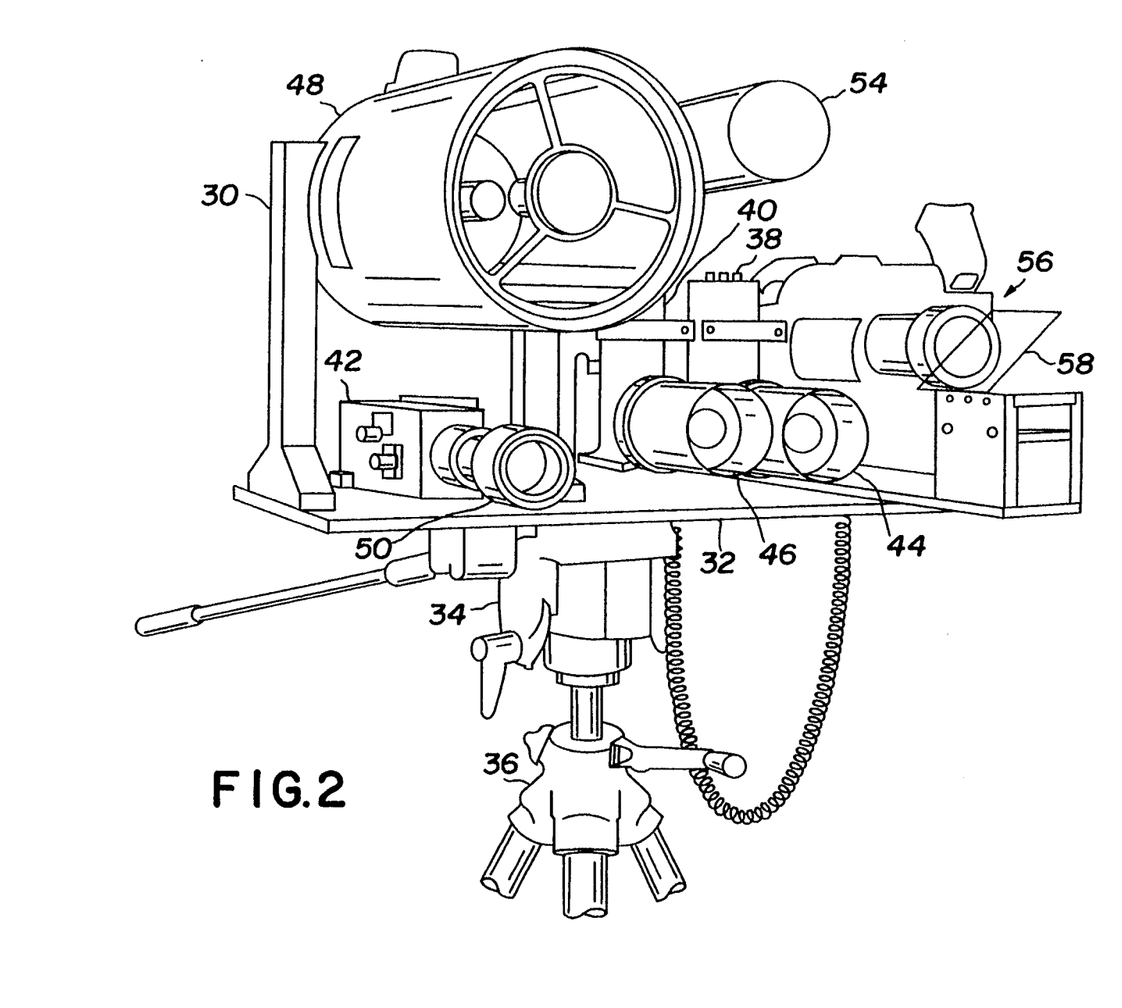
FIG. 2 is a frontal perspective view of an apparatus which is designed in accordance with an actual working embodiment of the present invention for carrying out the technique illustrated in FIG. 1.
Figure 3:
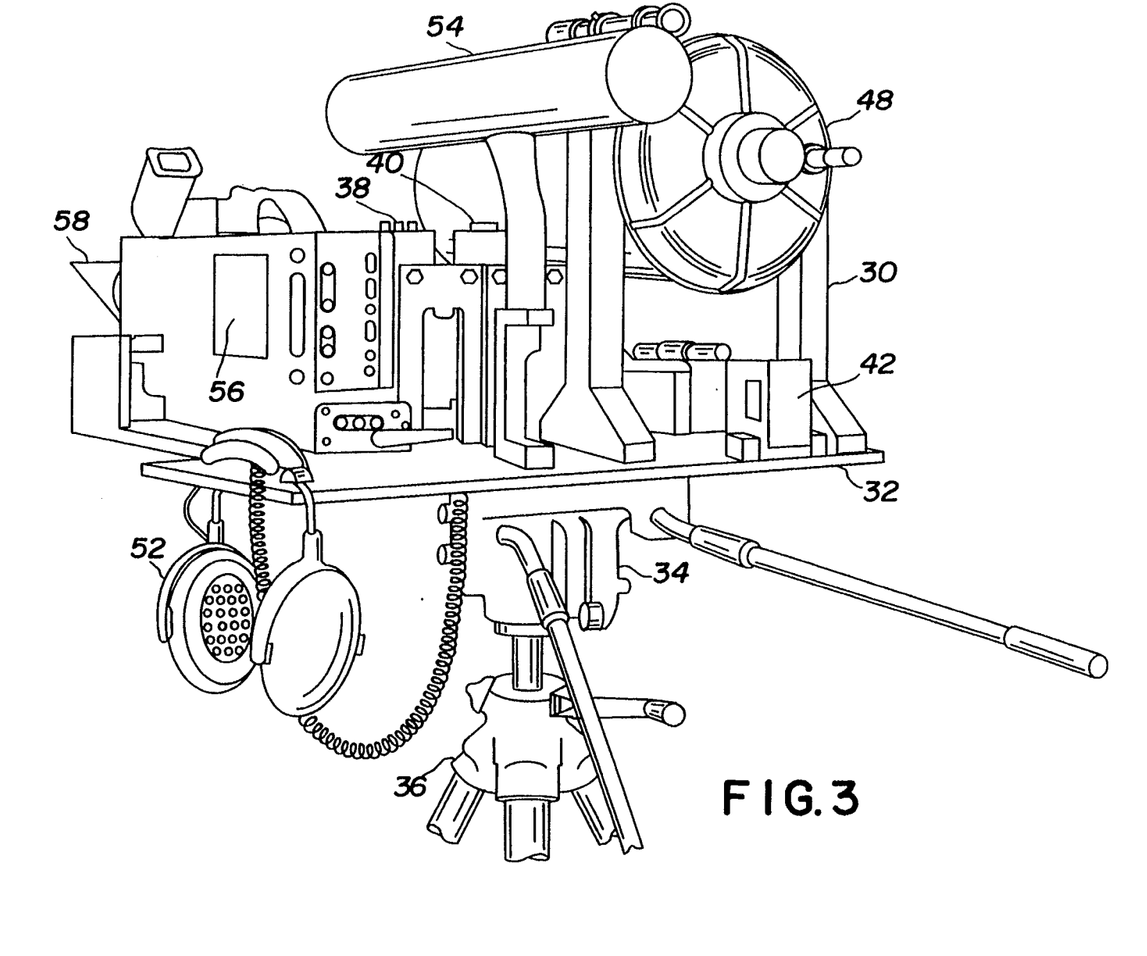
FIG. 3 is a rear perspective view of the apparatus of FIG. 2.

As indicated previously, FIGS. 2 and 3 are front and rear views, respectively of apparatus 30. Appendix I, appearing at the end of this specification, is a brief list of some of the components of the sensor suite forming part of the overall apparatus. All of the sensors are co-aligned and mounted on a 12 by 18 inch magnesium plate 32 which together weigh approximately 48 pounds. The sensor platform is mounted on a Bogen fluid head 34 supported by a sturdy tripod 36 so that smooth manual tracking of targets can be achieved. The entire sensor suite can be fielded to almost any ground location, since all of the electronics and recording equipment can be operated on battery power.

The sensor suite of overall apparatus 30 includes three optical sensors or detectors 38, 40 and 42 each of which responds to a different spectral bandwidth, which together extend from the visible (400 nm) to the IR (12 micrometers) spectrum. A mercury-cadmium-telluride (HgCdTe) detector 38 is used for detecting signals in the 8–12 micrometer spectral band, and an Indium-antimonide (InSb) detector 40 is used for signals in the 3–5 micrometer spectral band. Both of these IR detectors are liquid nitrogen cooled. A silicon photodetector 42 is used for signals in the 400–1100 nm spectral bands.

Overall apparatus 30, in an exemplary embodiment, also includes two 3-inch telescopes 44 and 46, and one 8-inch telescope 48 available on the sensor platform for the IR detectors. The 3-inch telescopes are Cassegrain reflectors with an effective focal length of 200 mm. The active area of both IR detectors 38 and 40 are 1 mm$^2$, giving an angular field of view of about 0.28 degrees. The 8-inch telescope 48 Schmidt is a Cassegrain reflector. Its focal length is 2000 millimeters giving an angular field of view of about 0.028 degrees. The two detectors 38 and 40 can thus simultaneously view a target with identical three-inch telescopes or one of the detectors can be mounted with a three-inch and the other with an eight-inch telescope. The telescopes are completely interchangeable with the detectors. The visible-near-IR detector 42 is a silicon detector that responds to the 400–1100 nm spectral band. A 75 millimeter focal length zoom lens 50 with an effective aperture of 46 mm is used. The visible detector 42 is used for among other things, detecting targets that modulate ambient light, such as spinning propellors from helicopters and prop-driven aircraft. It is to be understood that this embodiment may include lenses with any field of view including fish-eye lenses.

The apparatus 30 also includes a pair of headsets 52 which enables an operator to listen to any channel, and a directionally sensitive microphone 54 that is useful for correlating the acoustic signature of a target to its modulated optical signature. A video camera 56 is mounted on the platform 32 and coaligned with the other sensors. An optical sight 58 that creates a retical image is mounted directly in front of the camera lens. The video camera 56 is thus used not only for recording the image of the target, but also for aiming the sensors and tracking the target.

Figure 4:
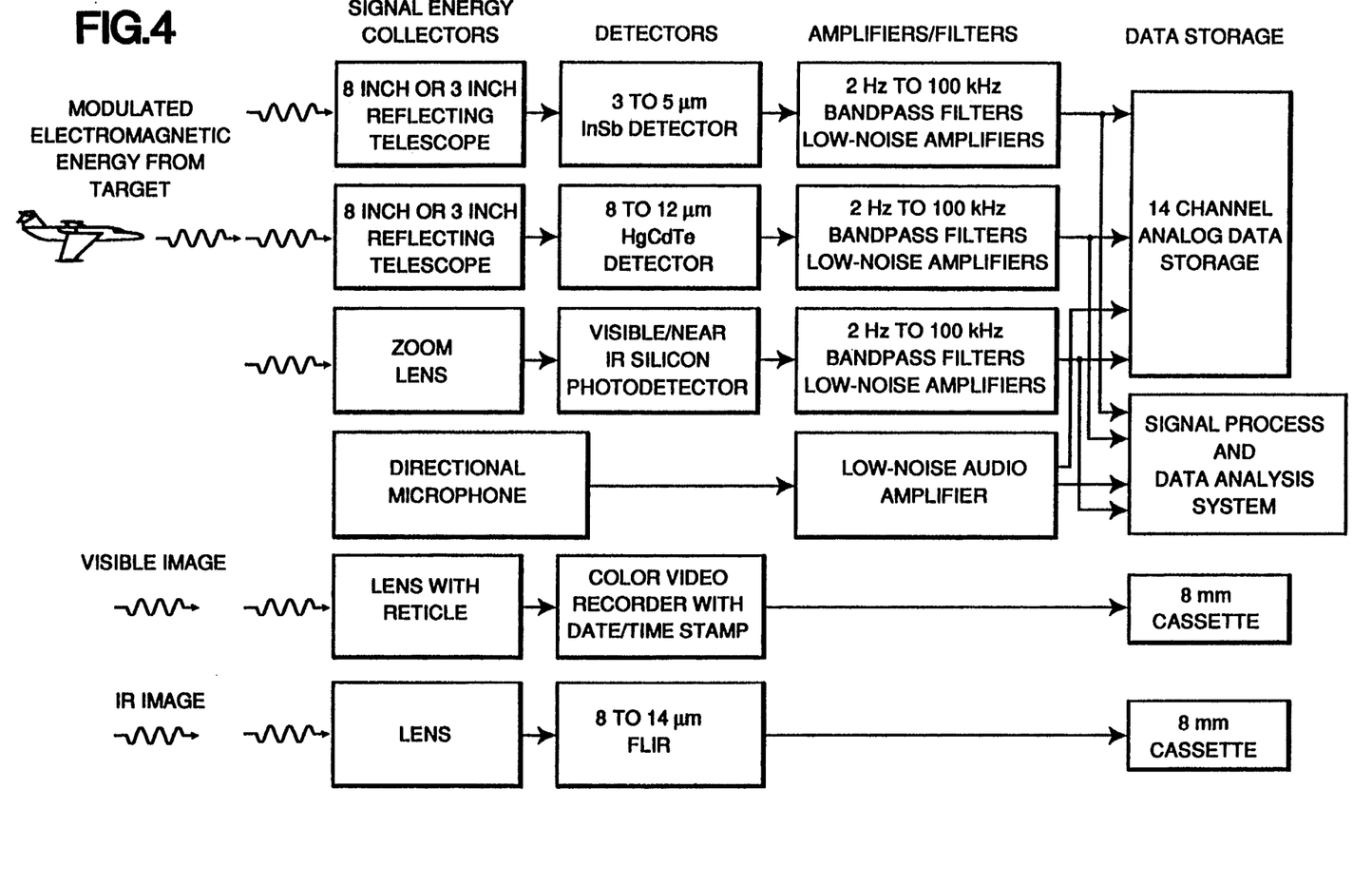
FIG. 4 is a block diagram illustrating the operating features of the apparatus of FIGS. 2 and 3.

Turning now to FIG. 4, as stated previously, this figure is a block diagram of the operating features of apparatus 30, specifically its optical listening sensor suite. The outputs of all three detectors are AC coupled to reduce noise due to background dc sources. Gain can be adjusted for each detector with a "volume" control knob. The amplifier output may be fed through high-and-low-pass analog filters to remove low-frequency interferences or high frequency hiss. The cutoff frequencies are selectable so that several pass-bands can be obtained. The largest selectable bandwidth is from 2 Hz to 100 kHz. Each detector has its own amplifier/filter circuits.

Final output signals from all of the sensors are recorded on VHS videocassette tape with a 14 channel analog data recorder. The data recorder is programmable and has a dual channel display. Its maximum recording band width is 40 kHz, with a signal-to-noise ratio of 46 dB. Data are time-stamped, and their duration can be recorded. The recorded video image is time-stamped and synchronized with the analog data recorder. An additional component of the sensor suite is an IR imaging radiometer (FLIR). This FLIR augments the color video camera imagery with IR imagery. The FLIR detector is liquid nitrogen cooled (HgCdTe) and has a spectral response in the 8 to 14 micrometer region.

Figure 5:
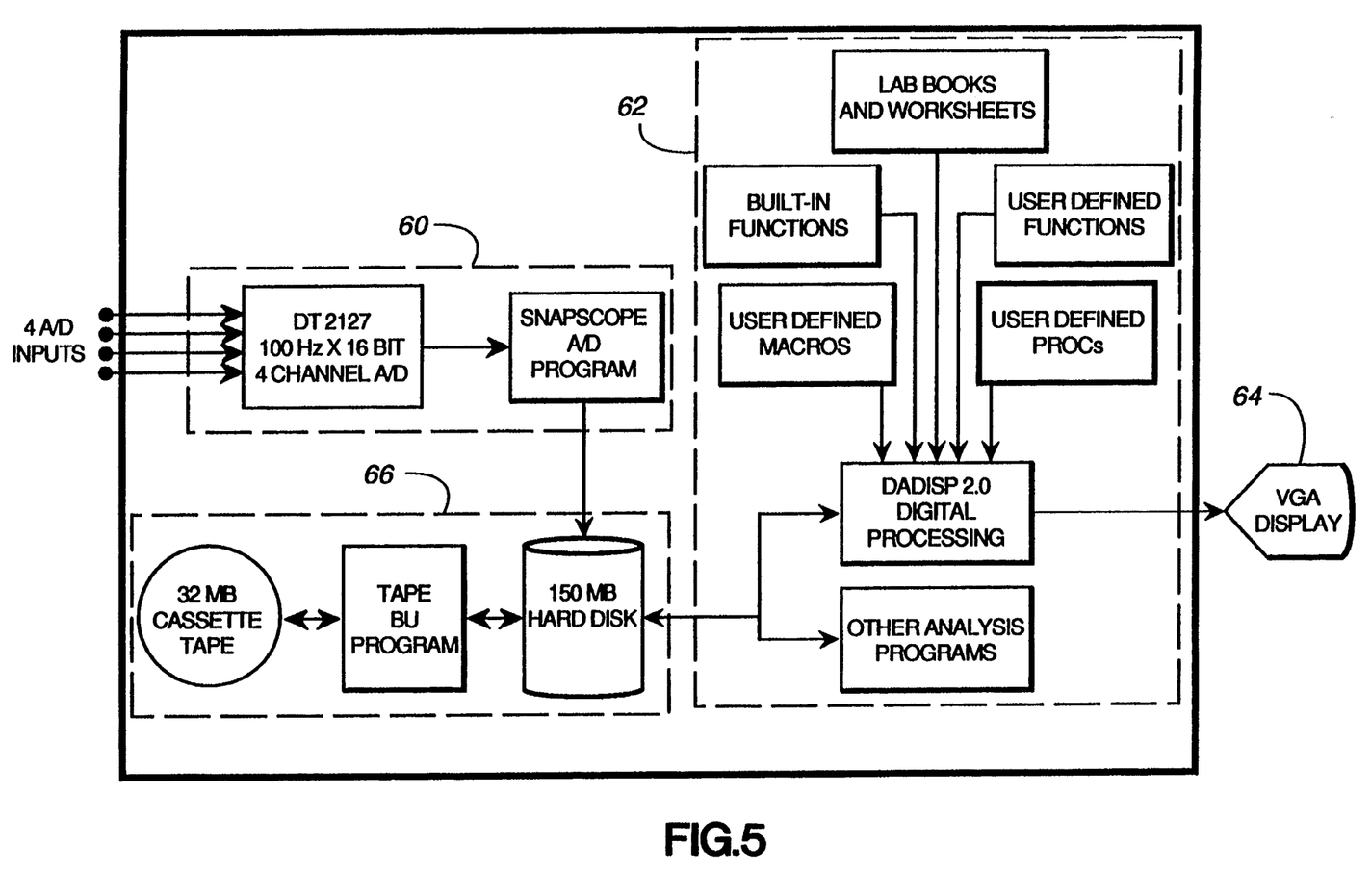
FIG. 5 is a block diagram of a signal processing and data analysis system incorporated in the operation of the apparatus of FIGS. 2 and 3.

Turning now to FIG. 5, attention is directed to an optical listening signal and data analysis system, forming part of overall apparatus 30. This system comprises digital data acquisition 60, processing 62, display 64, and storage 66, as illustrated in FIG. 5. The signal processing system hardware includes computer apparatus such as an 80286 IBM based-computer that runs the processing software 62 at 20 Mhz and an 8027 floating point coprocessor (not shown), 5 MB random access memory for storing the portions of the processing hardware 62 not being used by the computer, 150 MB hard disk, and a high resolution VGA color monitor. An external 8 millimeter tape drive allows the system to transfer 32 MB of data to tape for backup.

Analog-digital conversion is performed by a Data Translation model DT-2827A/D board. The board has four differential inputs, allowing for signals from all four sensors to be digitized simultaneously. Sample rate is 100 kHz, with an A/D conversion time of six microseconds. Conversions are made with 16 bit-resolution, giving a dynamic range of approximately 96 dB.

Data are analyzed with a data analysis/signal processing software package called DADiSP by DSP Development Corporation. The software package allows the system to perform signal processing functions in the field for quick-look analysis of the data and to perform more sophisticated post-analysis. This software efficiently performs two functions on pairs of sensor signals, the cross-ambiguity function (CAF) and the Wigner distribution function (WDF).

Figure 6A:
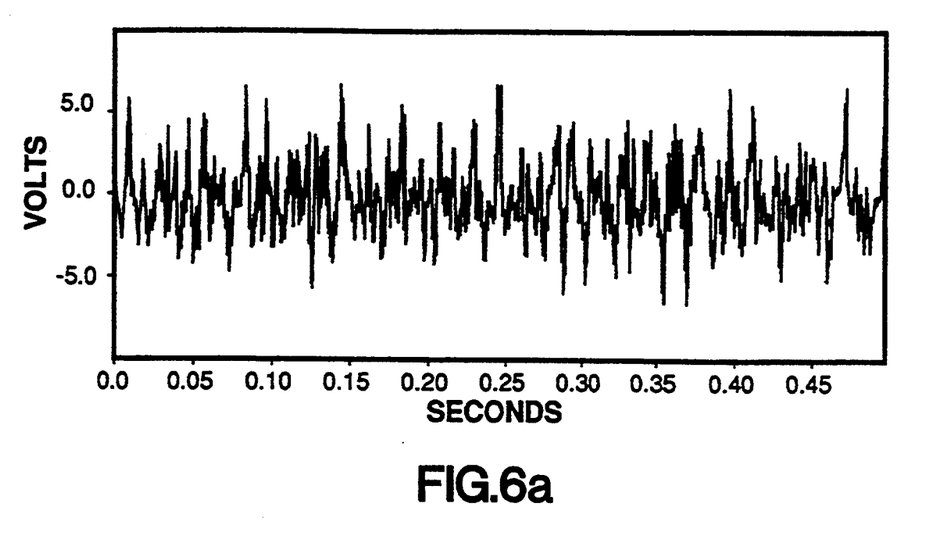
FIGS. 6a and 6b graphically illustrate digitized and Fourier transformed optical listening signatures of a particular object, which signatures are produced as the result of the operation of the apparatus of FIGS. 2 and 3.
Figure 6B:
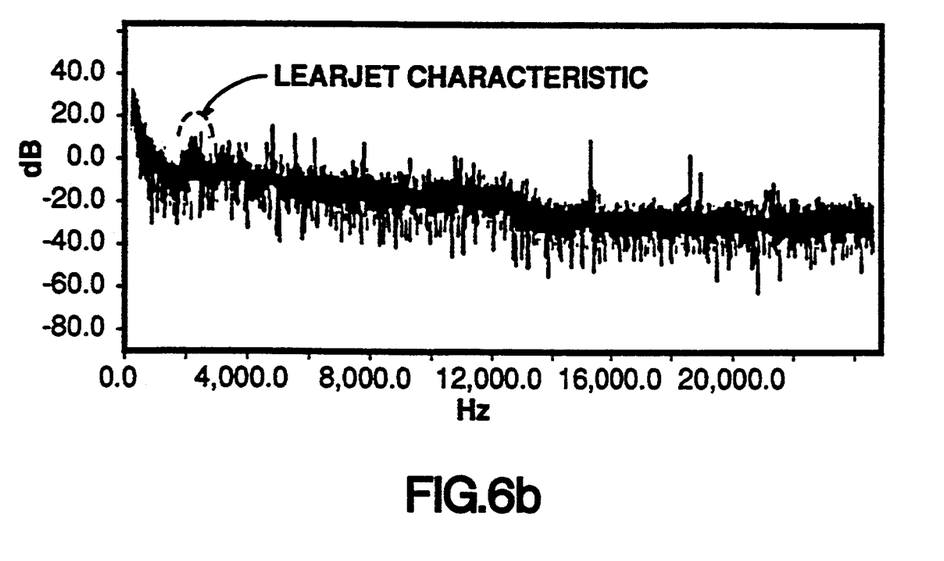

A sample of optical listening data digitized by the system illustrated in FIG. 5 is shown in FIG. 6A. FIG. 6B displays the Fourier transform of the same data. This particular data record is the 3 to 5 micrometer signature of a Lear jet seen from behind during takeoff. The range is several kilometers. One of the characteristics of the Lear jet's signature is the hump in the spectrum at about 2 kHz.

The actual apparatus illustrated in FIGS. 2 and 3 and described in conjunction with FIGS. 4–6 has been used to optically listen to a variety of targets. One such target is a prop-driven airplane. When viewed from the front, the IR radiation from its hot engine will be chopped by the rotating propeller, providing an IR signature. The headlight beam is also chopped by the propeller, providing another signature. In addition, reflected ambient light, is modulated by the propellor and by the vibrating body of the airplane, providing still another signature. Further, apparatus 30 has recorded the modulation of exhaust gases in the wake of the spinning propellers. From all of this information, overall apparatus 30 can readily determine that the object in question is, indeed, a prop-driven airplane. A helicopter can be detected in a similar way. Although actual apparatus 30 is quite sophisticated, it is to be understood that the invention is not limited to all the features making up the apparatus. Rather, the present invention can take the more simplified form illustrated in the block diagram of FIG. 1.

| APPENDIX I | | |
|---|---|---|
| SENSOR SUITE COMPONENT | | SPECIFICATIONS |
| Visible/Near Infrared Detector | Type: Manufacturer: | Silicon Photodetector United Detector Technologies |

APPENDIX I

| SENSOR SUITE COMPONENT | | SPECIFICATIONS |
|---|---|---|
| | Spectral Bandwidth: | 400–1100 nm |
| | Optics: | 75 mm focal length zoom lens, 46 mm aperture |
| | Electronics: | Variable gain low-noise ampliers, 2 Hz to 100k |
| Infrared Detector | Type: | Mercury Cadmium Telluride (HgCdTe) |
| | Manufacturer: | Infrared Associates, Inc. |
| | Spectral Bandwidth: | 8–12.5 μm |
| | Optics: | .01 cm² |
| | Electronics: | Variable gain low noise amplifiers, 2 Hz to 100k |
| Infrared Detector | Type: | Indium Antimonide (InSb) |
| | Manufacturer: | Infrared Associates, Inc. |
| | Spectral Bandwidth: | 3–5 μm |
| | Optics: | .01 cm² |
| | Electronics: | Variable gain low-noise amplifiers, 2 Hz to 100k |
| FLIR | Type: | Mercury Cadmium Telluride (HgCdTe) |
| | Manufacturer: | Inframetrics |
| | Spectral Bandwidth: | 8–14 μm |
| | Field-of-View | 150 vertical by 20° horizontal |
| Video/Audio Recorder | Type: | Camcorder |
| | Manufacturer: | Sony |
| | Spectral Bandwidth: | 8 mm video format cassette |
| | Optics: | Color |
| | Electronics: | Stereo |
| Directional Microphone | Type: | Modified condensor shot gun |
| | Manufacturer: | Georg Neumann GmbH (Berlin) |
| | Recording: | <10 Hz–20 kHz |
| | Video: | 21 mV/Pa |
| | Audio: | Lobe shaped (shot gun) |
| Telescope | Type: | Modified Schmidt-Cassegrain |
| | Manufacturer: | Celestron |
| | Bandwidth: | 8 inch |
| | Sensitivity: | 2000 mm |
| Telescope | Type: | Cassegrain |
| | Manufacturer: | Molectron Detector, Inc. |
| | Aperture: | 3 inch |
| | Focal Length: | 200 mm |
| Analog Data Recorder | Type: | 14 channel FM IRIG WB G–I/High Band |
| | Manufacturer: | TEAC |
| | Recording: | DC-40 kHz bandwidth, VHS videocassette tape |

What is claimed:

1. A method of identifying a particular object from which electromagnetic radiation is emitted and/or reflected at an intensity that fluctuates in accordance with a frequency pattern unique to that object, said method comprising the steps of:

(a) detecting electromagnetic radiation that is emitted and/or reflected from an object during normal operation and is not provided as a special identification signal transmitted for the purpose of identifying the object;

(b) converting said detected radiation to an electric signal having the same unique frequency pattern as the electromagnetic radiation itself, the frequency pattern of said electrical signal serving as an identifying signature of said object; and (c) using said electrical signal to identify said object.

2. A method according to claim 1 wherein said electrical signal is used to produce an acoustical signal at an intensity that fluctuates in accordance with a frequency pattern unique to said object and easily discernable by the human ear.

3. A method according to claim 1 wherein said electric signal is compared with one or more pre-established identifying signatures of known objects in order to identify the object in question.

4. A method of identifying an object that introduces intensity fluctuations into electromagnetic radiation emitted and/or reflected from the object, said fluctuations having a frequency not easily discernible by the human eye, but characteristic of said object, said fluctuations being incidental to normal operation of said object and not provided as a special identification code for the purpose of identifying said object, said method comprising the steps of:

(a) detecting said electromagnetic radiation; and (b) producing from said detected radiation an acoustic signal at an intensity that fluctuates at a frequency which is also characteristic of said object but which is easily discernible by the human ear, whereby a person is able to listen to said acoustical signal and thereby identify said object.

5. A method according to claim 4 wherein the frequency of said electromagnetic radiation is within the bandwidth of the human ear and wherein said acoustic signal is produced at the same frequency as said radiation.

6. A method according to claim 5 wherein said acoustic signal is produced by first converting said radiation to an intermediate electrical signal from and at the same frequency as said electromagnetic radiation and thereafter producing said acoustic signal from and at the same time frequency as said intermediate electrical signal.

7. A method according to claim 4 wherein the frequency of said electromagnetic radiation is above the bandwidth of the human ear, and wherein said acoustic signal is produced by first converting said radiation to an intermediate electrical signal from and at the same frequency as said electromagnetic radiation, then down-converting said electrical signal to a lower frequency characteristic of said object and easily discernible by the human ear, and thereafter producing said acoustic signal from said downconverted electrical signal.

8. A method according to claim 4 wherein said spectral bands of interest consists of the ultraviolet, visible, and infrared bands.

9. A method according to claim 4 wherein said object is a fluctuating source of said radiation.

10. A method according to claim 4 wherein said step of detecting said radiation includes independently detecting radiation within a plurality of sub-bands of said spectral band of interests.

11. A method according to claim 10 wherein said spectral band extends from the ultra-violet spectrum starting at about 200 nm to the far infrared spectrum ending at about 14 μm.

12. A method according to claim 11 wherein said sub-bands includes the following:

400 μm–1100 μm
   3 μm–5 μm
   8 μm–12 μm

13. A method according to claim 4 including the step of making a video recording of said electromagnetic radiation as it fluctuates in intensity from said object.

14. A method according to claim 4 wherein said object and/or the means used to detect said object moves and including the step of tracking said object as the object and or the detecting means moves relative to the other.

15. A method of identifying objects that cause the intensity of electromagnetic radiation which is emitted and/or reflected from the object to fluctuate in accordance with a frequency pattern unique to the object, wherein said frequency pattern is provided incidental to normal operation and not provided as a special identification code for the purpose of identifying the object, said method comprising the steps of:
  (a) detecting said electromagnetic radiation;
  (b) converting said detected radiation to an electric signal having the same unique frequency pattern as the electromagnetic radiation itself, the frequency pattern of said electrical signal serving as an identifying signature of the object;
  (c) comparing said identifying signature of said object in question with one or more pre-established signatures of known objects; and
  (d) from the comparison between said identifying signature and said pre-established signatures, identifying the object in question.

16. A method according to claim 15 including the step of producing from said detected radiation an acoustic signal at an intensity that fluctuates in accordance with a frequency pattern unique to said object and which is easily discernible by the human ear, whereby a person is able to listen to said acoustical signal and thereby identify said object.

17. An apparatus for identifying objects that cause the intensity of electromagnetic radiation which is emitted and/or reflected from the object to fluctuate in accordance with a frequency pattern unique to the object, wherein said frequency pattern is provided incidental to normal operation and not broadcast as a special identification code for the purpose of identifying the object, said apparatus comprising:
  (a) means for detecting said electromagnetic radiation;
  (b) means for converting said detected radiation to an electrical signal having the same unique frequency pattern as the electromagnetic radiation itself, the frequency pattern of said electrical signal serving as an identifying signature of the object; and
  (c) means for comparing said identifying signature of said object in question with one or more pre-established signatures of known objects, whereby from the comparison between said pre-established signatures, the object in question can be identified.

18. An apparatus according to claim 17 for identifying objects that emit electromagnetic radiation at intensities that fluctuate in accordance with frequency patterns unique to the objects, wherein said means for comparing said identifying signature comprise means for comparing said signature with a pre-established signature for electromagnetic radiation emitted by at least one of an AC-powered light, a missile launch, rocket launch, artillery flash, gunfire, explosion, ground fire, target designator, rocket plume, electric arc, flare, and sun glint.

19. An apparatus according to claim 17 for identifying objects that modulate ambient light wherein said means for comparing said identifying signature comprise means for comparing said signature with signature with a pre-established signature for sunlight reflected from at least one of a helicopter, airplane, wheeled vehicle, jet, motor, and generator.

* * * * *